June 14, 1966 L. BERNSTEIN ETAL 3,256,100

METHOD AND APPARATUS FOR FROZEN DESSERT

Filed Jan. 25, 1962 2 Sheets-Sheet 1

INVENTORS.
LEO BERNSTEIN
THOMAS KENNETH KELLY
NORMAN N. POTTER

BY *Arthur J. Plantamura*

ATTORNEY.

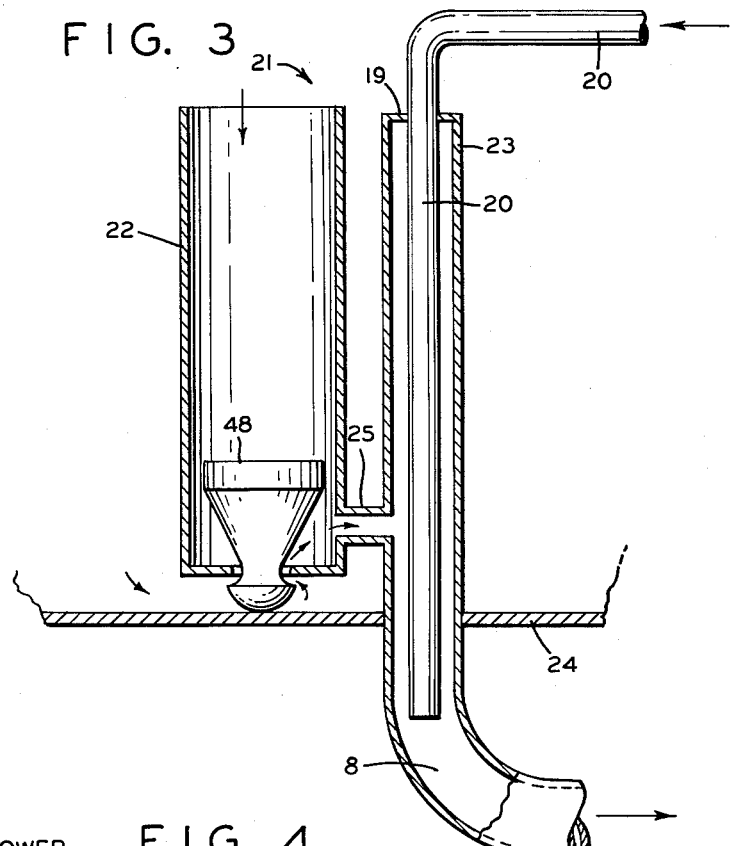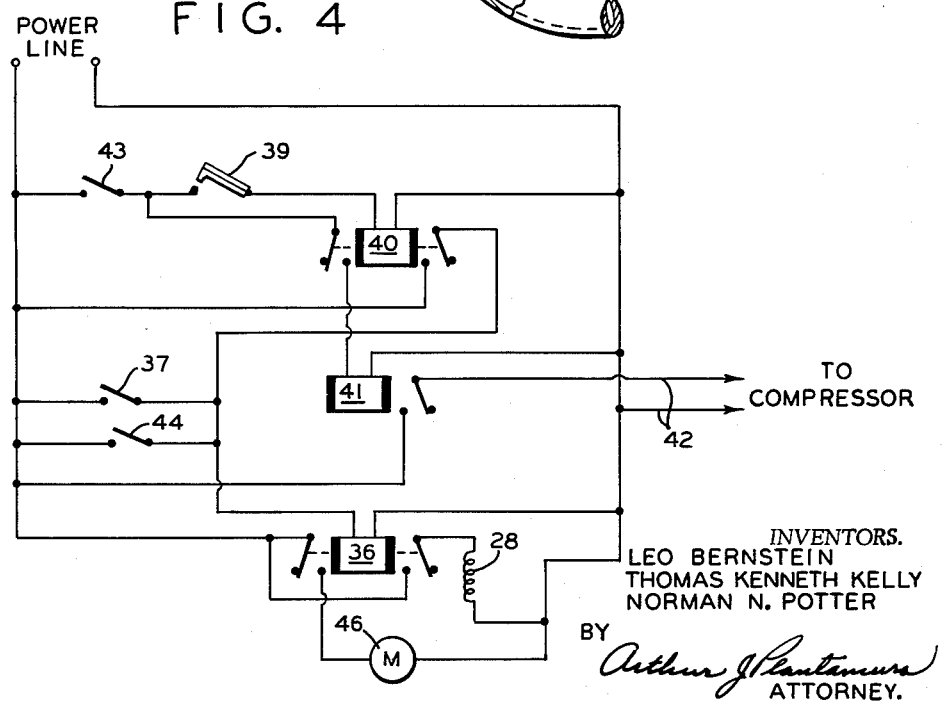

United States Patent Office 3,256,100
Patented June 14, 1966

3,256,100
METHOD AND APPARATUS FOR FROZEN DESSERT
Leo Bernstein, New York, N.Y., and Thomas Kenneth Kelly, Fairfield, and Norman N. Potter, Stamford, Conn., assignors to American Machine & Foundry Company, a corporation of New Jersey
Filed Jan. 25, 1962, Ser. No. 168,759
11 Claims. (Cl. 99—136)

This invention relates to an apparatus for producing carbonated frozen confections such as dairy desserts, e.g. soft ice cream or frozen custard, frosty milk shakes, malted drinks and the like.

More specifically, the invention relates to an apparatus to be used in conjunction with a process for the flavor enhancement of dairy desserts, such as soft ice cream, frosty malteds and the like, by the incorporation into such desserts of controlled amounts of carbon dioxide. That the process which provides a dessert of solid or semi-solid consistency which combines the cooling and refreshing qualities associated with frozen desserts and the desirable characteristics of carbonated beverages is described in detail in the pending application of L. Bernstein et al., S.N. 121,318, filed on July 3, 1961, entitled "Method of Preparing Dairy Dessert," and now abandoned.

This invention provides an arrangement which may be used in connection with ice cream freezers of the type now in use and which is adaptable so that the freezer may be used in the usual manner to produce non-carbonated frozen desserts or may be used to produce carbonated frozen dairy desserts, which can be dispensed directly from the freezer to the customer.

It is an object of the present invention to provide an apparatus for producing frozen desserts in which an accurately controlled and uniform quantity of carbon dioxide is introduced into the dessert.

It is a further object of the invention to provide a device which will work continuously and provide automatically and instantaneously the amount of carbon dioxide gas necessary for maintenance of the proper carbonation level.

Another objective of this invention is the provision of a device that is simple in construction, efficient in operation and operates so as to inject the carbon dioxide just slightly above atmospheric pressure, thereby eliminating the high pressure construction and hazard associated with conventional carbonators.

Further objects of this invention will appear from the following description taken in conjunction with the accompanying drawings:

FIG. 3 is a detailed view of the mix feed assembly and liquid contact zone sections which are situated prior to the freezing chamber.

FIG. 4 is a suitable wiring diagram for the apparatus.

Figure 1:
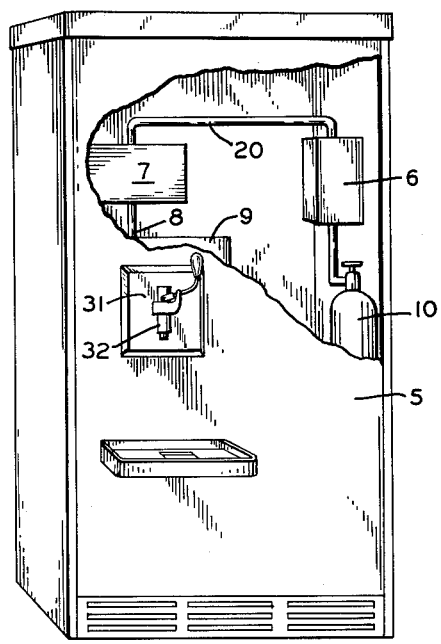
FIG. 1 illustrates a carbonator-freezer unit partially broken away to show generally various components of the carbonator-freezer mechanism.

Referring to FIG. 1 of the drawing, a frozen dessert carbonator-freezer unit 5 of a general dimension and shape is illustrated, showing in a general way various elements to be discussed and described in greater detail in subsequent figures. Carbon dioxide gas from a suitable source such as a cylinder 10 is fed into the gas tube 20 after passing through a gas metering and control system section 6. From the carbon dioxide feed line 20, the gas enters the liquid feed section 7 where the liquid dessert mix and gas are premixed in a mixing zone 8 before passing into the freezing element 9 where the gas-liquid mixture is intimately blended and converted to the frozen consistency.

In accordance with the invention, we have discovered that certain critical conditions and arrangements must be adhered to in the carbonation of a frozen dessert if a practical and satisfactory result is to be achieved. In feeding the carbon dioxide gas into the system, it is important that the gas be associated with the liquid before these constituents are subjected to the beating action of the dasher. Secondly, it is critical that in making the pre-mix of carbon dioxide gas and liquid that the gas and liquid streams be joined while moving in a substantially concurrent direction so that turbulence is substantially avoided. Also, in order to accurately control the quantity of carbon dioxide incorporated into the frozen dessert, it is critical to appropriately synchronize the flow of gas with the operation of the beater.

Figure 2:
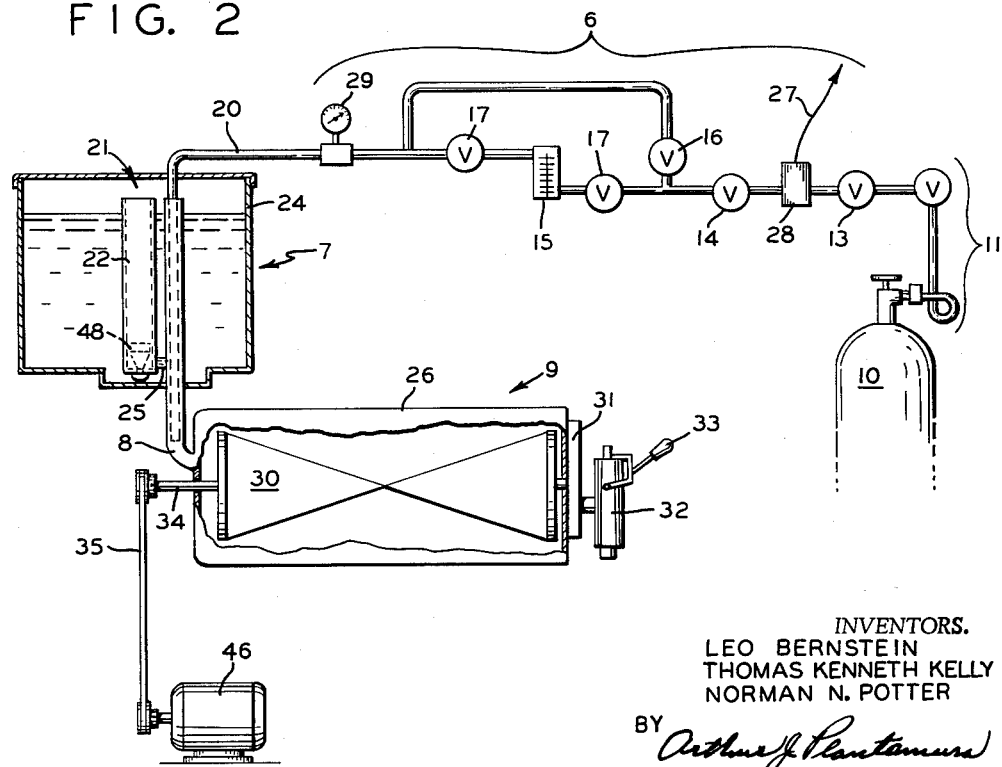
FIG. 2 is a diagrammatic view of the carbonator-freezer system of the invention.

Referring now to FIG. 2 of the arrangement, the system comprises a compressed carbon dioxide gas tank 10 equipped with a manifold section 11 of conventional design to permit quick changeover of gas tanks. The carbon dioxide is fed through a metering and control section 6 which comprises an arrangement of commercially available elements to provide suitable feed of the gas including: a gas regulator 13 which will reduce the gas pressure from tank pressure to a safe operating level; a gas metering valve 14 which will keep the rate of gas flow at a level found critical for the production of carbonated dairy desserts, a rotameter 15 which monitors the rate of flow passing into the feed line 20. The gas pressure and the gas flow rate are maintained through controls within the limits found critical as described in the above referred to patent application S.N. 121,318 for the smooth operation of the carbonator-freezer, either by manual or automatic adjustment. In order to permit operation during malfunction or breakage of the rotameter, the device is equipped with a series of standard by-pass elements including valves 16 and 17. The gas passing through the flow section 6 is directed through a gas tube 20 which is of suitable dimension so that the carbon dioxide flows at some significant velocity and moderate pressure generally below about 25 p.s.i.g. and preferably below 10 p.s.i.g. in conventional systems open to atmospheric pressures. The gas tube 20 is positioned and arranged within the liquid mix feed assembly 21 shown more in detail in FIG. 3. The gas tube or line 20 is contained in concentric tube 23 which leads to the freezing chamber 26. The tube 20 terminates in an area adjacent to the freezing chamber 26, thus creating a zone 8 where the gas is associated with, or is loosely incorporated into the liquid mix, before the liquid is drawn into the freezing chamber 26. That part of the liquid mix feed assembly 21 holding the concentric gas tube 23 is sealed or otherwise substantially closed off at the top 19, thus creating a gas reservoir above the liquid mix level in the space between the outer wall of tube 20 and the inside wall of the tube 23. The gas reservoir is in association with zone 8. The gas reservoir is required for developing sufficient back pressure to insure incorporation of the gas into the liquid mix and thus maintaining a uniform self-adjusting flow of carbon dioxide gas into the freezing chamber 26. It will be apparent that other arrangements may be employed to provide a gas reservoir suitable for this purpose. Both a mixing zone preferably situated between the open terminal of the gas feed tube 20 and the inlet to the freezing chamber, and the gas reservoir, are necessary for the proper operation of the device. It is important that the arrangement permits discharge of the gas in a direction substantially concurrent with the flow of the mix and not countercurrent. This prevents blow-back of the mix into the mix feed tube and holds splashing to a minimum. It also permits continued refill of the freezing chamber, and avoids loss of gas.

The liquid flow control element 48 may be of any conventional design which allows flow substantially independent of the liquid level in the reservoir hopper 24 and permits venting through the top of 22 and aperture 49 in top of the hopper 24.

The mixture of liquid and carbon dioxide produced in zone 8 is thereafter fed into a freezing chamber 26 of conventional design having a refrigerating jacket and containing a dasher or beating element 30 which functions to whip or fold the gas into the liquid mixture during the freezing step. Power for the dasher is provided to the dasher shaft 34 through suitable linkage such as belt 35 connected to a motor 46. The chamber 26 contains a conventional gate or door 31 removably secured for cleaning and servicing and a standard draw-off assembly 32 equipped with a handle 33 which is actuated to draw-off the frozen confection.

The admission of gas is synchronized with the action of the freezer dasher by means of a solenoid valve 28 connected by suitable electric connection to a dasher relay switch. The valve 28 is normally closed and will permit the carbon dioxide to pass through only when the valve 28 is actuated by the dasher 30 which in turn is actuated by handle 33. The dasher may also be actuated by the compression cycle as described hereinbelow. A pressure gauge 29 indicates line pressure which is maintained slightly above atmospheric for best results.

The operation of the device of the invention will now be further described in conjunction with FIG. 4 which shows the arrangement whereby the solenoid valve and the beater motor are connected electrically to provide a self-adjusting control for gas introduction and incorporation.

Feed of the proper level of carbon dioxide may be initiated by manipulating the handle 33 on the draw-off assembly 32 which in turn actuates switch 37. Closing switch 37 has the effect of turning the dasher motor 46 which actuates the beater 30. At the same time, the solenoid valve 28, electrically connected through line 27 to the dasher relay 36, is opened and permits gas to flow at the predetermined rate. The flow rate may be adjusted manually by appropriately setting the gas metering valve 14 or by provision of a suitable automatic electric control valve (not shown) of the type commercially available.

The proper proportioned flow of carbon dioxide may also be introduced automatically through start-up switch 43 whenever the freezer-compressor (not shown) connected to lines 42 is thermostatically actuated. The thermostat 39 utilized conventionally in frozen dessert apparatus is electrically connected through the relays 40 and 41 to the compressor and to the dasher beater motor 46 through the dasher relay 36. Thus, whenever the compressor is operating, the solenoid valve 28 is opened and permits gas to flow at the predetermined rate.

A manual switch 44 is provided for selectively turning on the beater or dasher motor 46 and opening the solenoid valve 28 whenever carbonation level is low such as when there has been no product dispensed from the apparatus for some time. This auxiliary means is employed to provide additional carbon dioxide gas when additional freezing is not required and when there is no demand for withdrawing dessert.

It will be apparent to those skilled in the art that various modifications may be made in the details disclosed in connection with the description of the invention without departing from the scope of the inventive concept. Accordingly, the invention is not to be limited except insofar as necessitated by the appended claims.

We claim:

1. An apparatus for producing a carbonated confection which comprises a carbon dioxide gas feed tube through which carbon dioxide flows, control means to regulate the flow of said gas through said tube, a liquid confection mix feed conduit, a freezing chamber fed through a mixing zone by said conduit, a mixture beater in said chamber, said gas feed tube and said liquid feed conduit arranged to feed said gas and liquid, respectively, in a substantially concurrent direction leading to a mixing zone wherein the liquid and gas fed therein co-mingle prior to the beating and chilling action on the mixture in the freezing chamber, means synchronizing the flow of carbon dioxide with the operation of said beater, and independent of the flow of liquid feed, and mechanical means for actuating said beater and providing refrigeration in said freezing chamber.

2. An apparatus for producing carbonated frozen dairy desserts which comprises a carbon dioxide gas feed tube through which the carbon dioxide flows, control means to regulate the flow of said gas through said tube, a liquid dairy mix feed conduit connected to a dairy mix supply, a freezing chamber into which dairy mix is fed through a mixing zone by said conduit, a mixture beater in said chamber, said gas feed tube being positioned with respect to said liquid feed conduit so as to introduce carbon dioxide in a direction concurrent with the flow of liquid mix, said gas feed tube terminating in a mixing zone in which the gas is mixed with the liquid prior to subjecting the mixture of liquid and gas to the beating and chilling action in the freezing chamber, a gas reservoir in communication with said mixing zone, means synchronizing and permitting the flow of carbon dioxide only during the operation of said beater and independent of the flow of liquid feed, and mechanical means for actuating said beater and providing refrigeration in said freezing chamber.

3. The apparatus of claim 2 in which said synchronizing means comprises a solenoid valve in the carbon dioxide gas feed tube electrically connected to said beater actuating means.

4. The apparatus of claim 2 in which said gas feed tube is concentrically positioned in spaced relationship within said freezer mix conduit and said conduit is sealed above the inlet of said gas feed tube to provide a gas reservoir within the concentric space.

5. A method of preparing a carbonated dairy dessert which comprises admixing at substantially atmospheric pressure streams of liquid dessert mix and carbon dioxide gas so as to produce substantially nonturbulent mixing of said streams effecting said admixture in a zone before subjecting the mixture to a beating and chilling step, and feeding said pre-mixture into a beating and freezing zone, the introduction of the carbon dioxide gas being synchronized so that the beating of the mixture in the freezing zone occurs concurrently as the gas is introduced and wherein the beating operation is independent of the introduction of liquid mix.

6. A method of preparing carbonated frozen dairy dessert which comprises blending at substantially atmospheric pressure a stream of carbon dioxide gas with a stream of liquid dairy dessert mix, each of said streams being fed into an associated mixture in a substantially concurrent direction, effecting admixture of said streams in a zone prior to the introduction thereof to the freezing step and intimately blending and freezing said associated mixture, the introduction of the carbon dioxide gas being synchronized so that the blending of the mixture during the freezing step occurs concurrently as the gas is introduced and wherein the beating operation is independent of the introduction of liquid mix.

7. In a refrigerating apparatus for making frozen confections from a liquid feed including a freezing compartment equipped with a dasher, a liquid confection reservoir, a liquid confection feed conduit leading from said reservoir to the freezing compartment, and actuating means for the dasher and for feeding said liquid confection, the improvement which comprises a liquid carbon dioxide gas feed tube equipped with means to provide a stream of carbon dioxide fed in controlled amounts in direction substantially concurrent to the liquid confection fed through said liquid feed conduit, an arrangement including a mixing zone affording means to form an associated mixture of the liquid and the gas prior to subjecting the mixture to the dasher and chilling action in the freezing compartment a gas reservoir in communication with said mixing zone, and means synchronizing the feed of carbon dioxide gas concurrent with the mixing action of the dasher in the freezing compartment and independent of the feed of liquid confection.

8. In a refrigerating apparatus for making frozen confections from a liquid feed including a freezing compartment equipped with a dasher, a liquid confection reservoir, a liquid confection feed conduit leading from said reservoir to the freezing compartment, and actuating means for the dasher and means for feeding said liquid confection, the improvement which comprises a liquid carbon dioxide gas feed tube arranged to provide a controlled stream of carbon dioxide gas substantially concurrent in direction to a liquid confection fed through said liquid feed conduit, a mixing zone for said liquid and gas to form an associated mixture thereof prior to subjecting the mixture to the beating and chilling action in the freezing compartment a gas reservoir in communication with said mixing zone, and means synchronizing the feed of carbon dioxide gas concurrent with the mixing action of the dasher in the freezing compartment and independent of the feed of liquid confection.

9. The apparatus of claim 8 in which the flow of the carbon dioxide gas stream is synchronized with the action of the dasher in said freezing compartment by means of a solenoid valve in said gas feed tube.

10. The apparatus of claim 8 in which said gas feed tube is concentrically disposed in spaced relationship within said confection feed conduit and said feed conduit is sealed above the inlet of said gas feed tube to provide said gas reservoir within the concentric space between said tube and said conduit.

11. An apparatus for producing carbonated frozen confection which comprises in association, a refrigerating unit for freezing the liquid confection, a carbon dioxide gas feed tube through which carbon dioxide gas flows, valve control means to regulate the flow of said gas through said tube, a liquid confection mix feed conduit connected to a feed reservoir, a freezing chamber fed through a mixing zone by said conduit, a mixture beater in said freezing chamber, said gas feed tube being arranged so as to introduce carbon dioxide in a direction substantially concurrent with the flow of the liquid, a zone where the gas is associated with the liquid prior to admittance of the mixture of gas and liquid into said freezing chamber, a gas reservoir in communication with said zone, means synchronizing and permitting the flow of carbon dioxide only during the operation of said beater and independent of the flow-liquid confection, and mechanical means for actuating said beater and for providing refrigeration in said freezing chamber.

References Cited by the Examiner

UNITED STATES PATENTS

| | | | |
|---|---|---|---|
| 376,495 | 1/1888 | Von Roden | 99—213 X |
| 1,397,168 | 11/1921 | Ingle | 99—136 |
| 2,375,833 | 5/1945 | Urquhart | 99—136 |
| 2,713,253 | 7/1955 | Chandler | 99—60 X |
| 2,924,952 | 2/1960 | Swenson et al. | 62—342 |

OTHER REFERENCES

Turnbow et al.: The Ice Cream Industry, 1947 (pp. 145, 148 and 414).

A. LOUIS MONACELL, *Primary Examiner.*

P. H. KREUZIGER, B. H. STRIZAK, R. S. AULL,
*Examiners.*